United States Patent
Coyle et al.

(10) Patent No.: US 6,337,746 B1
(45) Date of Patent: *Jan. 8, 2002

(54) INTERFACE CARD FOR COUPLING A COMPUTER TO AN EXTERNAL DEVICE

(76) Inventors: Jan R. Coyle, 7498 Old Hwy. 395, Carson City, NV (US) 89704; William H. Avery, Jr., 2900 Fantasy La., Sparks, NV (US) 89436; William H. Avery, III, 14210 Tanager La., Truckee, CA (US) 96161; Donald E. Harris, Sr., 2055 Howard Dr., Sparks, NV (US) 89434; Daniel F. Kolbet, 247 Freeport, Sparks, NV (US) 89431

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 33 days.

(21) Appl. No.: 08/987,212

(22) Filed: Dec. 9, 1997

(51) Int. Cl.[7] ................................................ G06F 15/00
(52) U.S. Cl. ................... 358/1.15; 358/1.13; 358/1.16; 358/442
(58) Field of Search ................................. 395/112, 113, 395/114, 115; 358/1.13, 1.14, 1.15, 1.16, 1.17, 407, 442; 712/209, 212, 236, 203; 713/500

(56) References Cited

U.S. PATENT DOCUMENTS

| | | | | |
|---|---|---|---|---|
| 5,566,277 A | * | 10/1996 | Hideshima et al. | 395/114 |
| 5,651,114 A | * | 7/1997 | Davidson, Jr. | 395/114 |
| 5,819,014 A | * | 10/1998 | Cyr et al. | 395/114 |
| 5,819,112 A | * | 10/1998 | Kusters | 395/856 |
| 5,892,969 A | * | 4/1999 | Young | 395/114 |
| 5,920,713 A | * | 7/1999 | Favor | 712/209 |
| 5,987,244 A | * | 11/1999 | Kau et al. | 713/500 |

* cited by examiner

*Primary Examiner*—Mark Wallerson
(74) *Attorney, Agent, or Firm*—Hogan & Hartson LLP

(57) ABSTRACT

Apparatus for printing a graphic image on a substrate, a method performed thereby and a card for use in the apparatus, the apparatus being composed of: a computer containing a motherboard which carries a card connector and random access memory, the computer being controlled by an operating system; a controller for storing image data in the random access memory; a card connected to the card connector and having a printing device interface and components for transferring stored image data from the random access memory to the printing device interface; and a digital color printing device connected to the printing device interface for printing the graphic image on the substrate on the basis of stored image data transferred from the random access memory.

6 Claims, 3 Drawing Sheets

INTERFACE CARD FOR COUPLING A COMPUTER TO AN EXTERNAL DEVICE

BACKGROUND OF THE INVENTION

The present invention relates to the production of color or monochrome documents that contain graphic images and/or text.

There are now many types of businesses that would benefit from the capability of producing such documents but this capability is unavailable to smaller businesses because of cost. Currently available systems capable of producing such documents in short time frames presently cost several tens of thousands of dollars. Systems of this type are marketed under trade names such as Fiery™, Splash™ and Colorbus™. These systems employ a computer, which may be of the PC type, a custom interface and a digital photocopier. Data needed for producing the document is stored on the computer's hard drive and then read out to the photocopier.

The custom interface must have enough memory on it to store all of the data needed to print a full document page before it begins to output it to the photocopier. Consequently such an interface is expensive. The cost of such systems is further increased by their inability to use commercially available graphics, or image manipulation, programs, and the attendant need to create system-specific programs for performing desired image manipulations.

Even these expensive systems have been found to be relatively slow, due in substantial measure to inherent limits on the speed with which the data can be read from the hard drive.

BRIEF SUMMARY OF THE INVENTION

It is a primary object of the present invention to provide a low cost capability of producing such documents.

Another object to the invention is to reduce the time needed to produce such documents.

A further object of the invention is to read into a computer data representing images present on printed documents.

The above and other objects are achieved, according to the present invention, by apparatus for printing a graphic image on a substrate, comprising: a computer containing at least one motherboard which carries a data bus and a random access memory, the computer being controlled by an operating system; means for storing image data in the random access memory; at least one card connected to the data bus and having a printing device interface and means for transferring stored image data from the random access memory to the interface; and a printing device connected to the interface for printing the graphic image on the substrate on the basis of stored image data transferred from the random access memory.

The printing device can be any device which will print a document in response to digital data. In the current state of the art, this encompasses printers which are constructed to be driven by a computer and digital photocopiers.

Objects according to the invention are further achieved by a method for printing a graphic image on a substrate, comprising: providing a computer containing at least one motherboard which carries a data bus and a random access memory, the computer being controlled by an operating system, at least one card connected to the data bus and having a printing device interface and means for transferring stored image data from the random access memory to the interface and a printing device connected to the interface; storing image data in the random access memory; transferring stored image data from the random access memory to the interface; and printing the graphic image on the substrate in the printing device on the basis of stored image data transferred from the random access memory.

Objects according to the invention are further achieved by the provision of a circuit card connectable in a card slot of a motherboard in a computer, the motherboard having a random access memory and a data bus connected to the memory, the circuit card comprising: a connector for connection to the data bus; an interface for connection to an external device; at least one circuit unit coupling the connector to the interface for effecting transfer of data between the random access memory and the external device; and a serial controller coupled between the circuit unit and the interface for transmitting a serial bit stream to the external device.

Apparatus according to the present invention can include any general purpose computer having a sufficiently large memory, in particular 128 MB or greater, any commercially available graphics software, such as Adobe Photoshop®, a novel interface card, application-specific software and a connector for connecting the interface card to a printing device.

The software employed includes selected commercially available graphics software which will be used in its intended manner to perform all desired image manipulation, i.e., to prepare an image for hard copy reproduction in a printing device. The software, in addition to the commercially available graphics software, controls the card in a manner to control flow of image data from the computer RAM to the printing device. The RAM can store image data for one or more complete document pages and the rate of delivery of data from the computer RAM is limited essentially by the printing device capabilities.

In the following description, reference will be made to a digital photocopier, or copier for the sake of brevity, as one example of a printing device. It is to be understood, however, that the invention is applicable to other types of printing devices which print documents in response to digital signals.

The novel card, is preferably an interface card having a connector for connection, via a card slot on the computer motherboard, to a data bus, also on the computer motherboard. The card itself is relatively simple, and hence inexpensive. This card is characterized by the fact that it must have only a small amount of memory. Therefore, since the card is the only specialized hardware needed, an advantage of the invention is the low cost at which it can be implemented. In contrast, in prior art systems of the type mentioned at the outset, use is made of a card having a large memory sufficient to store all of the data needed to print a complete document. As a result, such a card is relatively expensive, and this adds significantly to the cost of the system.

According to one novel feature of the invention, the card carries a serial controller, or serial port, for example a UART, having serial control lines connected to the interface on the card. The interface, in turn, has serial control lines connectable to the digital photocopier or other external device. Because the serial controller is mounted directly on the card and is connected to control logic on the card, the serial controller can be directly controlled by programming written to implement procedures according to the invention. Therefore, the serial controller, or serial port, can be controlled precisely and directly even in a Windows® environment. A serial port connected to a computer in the conventional way would have to be controlled by the Windows® system, which does not allow a program to communicate directly with such a serial port.

The card employs a connector to enable it to be coupled to a bus on the computer motherboard. For example, state-of-the art computer motherboards are commonly provided with a PCI bus or an AGP bus, each which is used for transferring data at high rates.

The PCI bus is a special bus on new Intel compatible IBM PCs. The provision of a PCI bus is significant because it can transfer data at a rate of the order of 132 megabytes (MB) per second with a 33 MHz clock and this opens the possibility of providing an interface card which will be installed in a card slot on the computer motherboard to interface with the PCI bus, and which will be connected to the digital photocopier to provide a complete interface between the computer and the digital photocopier.

Alternatively, the motherboard may be provided with an AGP bus, in which case the card will have an AGP connector. The AGP bus is capable of transferring data at rates as high as 512 MB per second and AGP busses operating at higher rates are expected to be available. The AGP bus has the advantage that it is not multiplexed among several different sources and destinations and hence can transfer data at rates closer to its theoretical maximum. Thus, the AGP bus can enable printing and scanning to be performed at a higher rate than the PCI bus.

In addition, when the AGP bus is used, the result is that one interface is removed from the PCI bus, which allows data to be transferred at a higher rate from a hard drive to memory.

All of the memory for storing image data for printing a full document is in the computer, and more specifically the computer motherboard RAM that is tightly coupled to the computer CPU, and not on the separate card. Then when it is desired to output the image data to the photocopier, all of that image data already resides in memory. It doesn't have to be transferred from one memory, or one memory region, to another, so that the time required to transfer that data is minimized.

The region of the memory which is to contain the image data may be designated a DMA (Direct Memory Access) buffer. The main program can transfer data directly from this memory region without requiring any preliminary transfer of data to another region of the memory.

Thus, a system according to the invention can be constructed from commercially available graphics software, a commercially available computer and a commercially available digital photocopier and only requires some specially prepared software and the novel interface card.

DETAILED DESCRIPTION OF THE INVENTION

Figure 1:
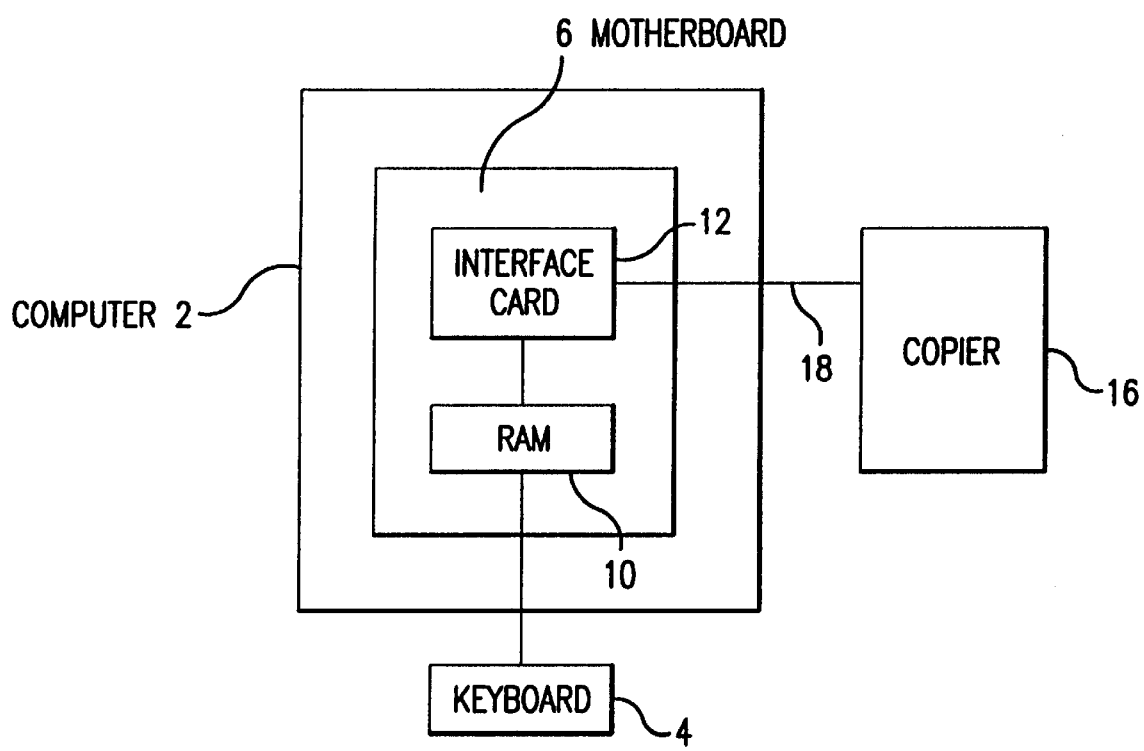
FIG. 1 is a block diagram of a complete system embodying the present invention for both printing color documents and scanning and storing image data present on previously printed documents.

FIG. 1 is a block diagram showing an arrangement of basic components to form a system embodying the present invention. These components include a computer 2, such as a personal computer, connected to a keyboard 4. Computer 2 includes a motherboard 6 which carries a random access memory (RAM) 10 and an interface card 12, which may be a PCI or AGP card and is mounted on motherboard 6 and connected, via connecting lines or busses on motherboard 6, to RAM 10. Card 12 is coupled to a digital copier 16 via a group of conductors 18 that include at least one data bus, serial control lines and input/output control lines. The number of each type of conductor employed depends on the specific configuration and requirements of copier 16.

Embodiments of the present invention are composed of any general purpose computer having a sufficiently large memory, in particular 128 Mb or greater, any commercially available graphics software, such as Adobe Photoshop®, a novel interface card, novel software and a connector for connecting the interface card to a digital copier.

The computer can be any computer provided with a PCI, AGP or comparable bus, including, but not limited to, an IBM, IBM compatible, DEC Alpha, or Apple Power PC. To achieve the full benefits of the invention, the computer should be equipped with 128 to 512 MB of RAM and preferably at least 256 MB of RAM, typically installed on the computer's motherboard. Even better performance will be achieved if the PC is equipped with more memory. PCs presently on the market contain more than 1 GB of RAM, and it would be expected that PCs having more RAM will be available in the near future.

Digital copier 16 may be any currently available digital copier such as those currently marketed by Xerox®. Such copiers have two capabilities: the can scan a printed document and output data representing images and text on the document in electronic form; and they can receive stored data and use it to print a color document.

The system according to the invention allows image data to be scanned, e.g., by a digital photocopier, and the scanned data to be stored in RAM 10. This data can be modified, as desired, under control of commercially available graphics software, as mentioned above, and the modified data can then be transferred from RAM 10 to the copier for printing. In prior art systems, it is necessary to write the data to a hard drive at some point between scanning and printing and this significantly reduces the speed of the overall process.

Figure 2:
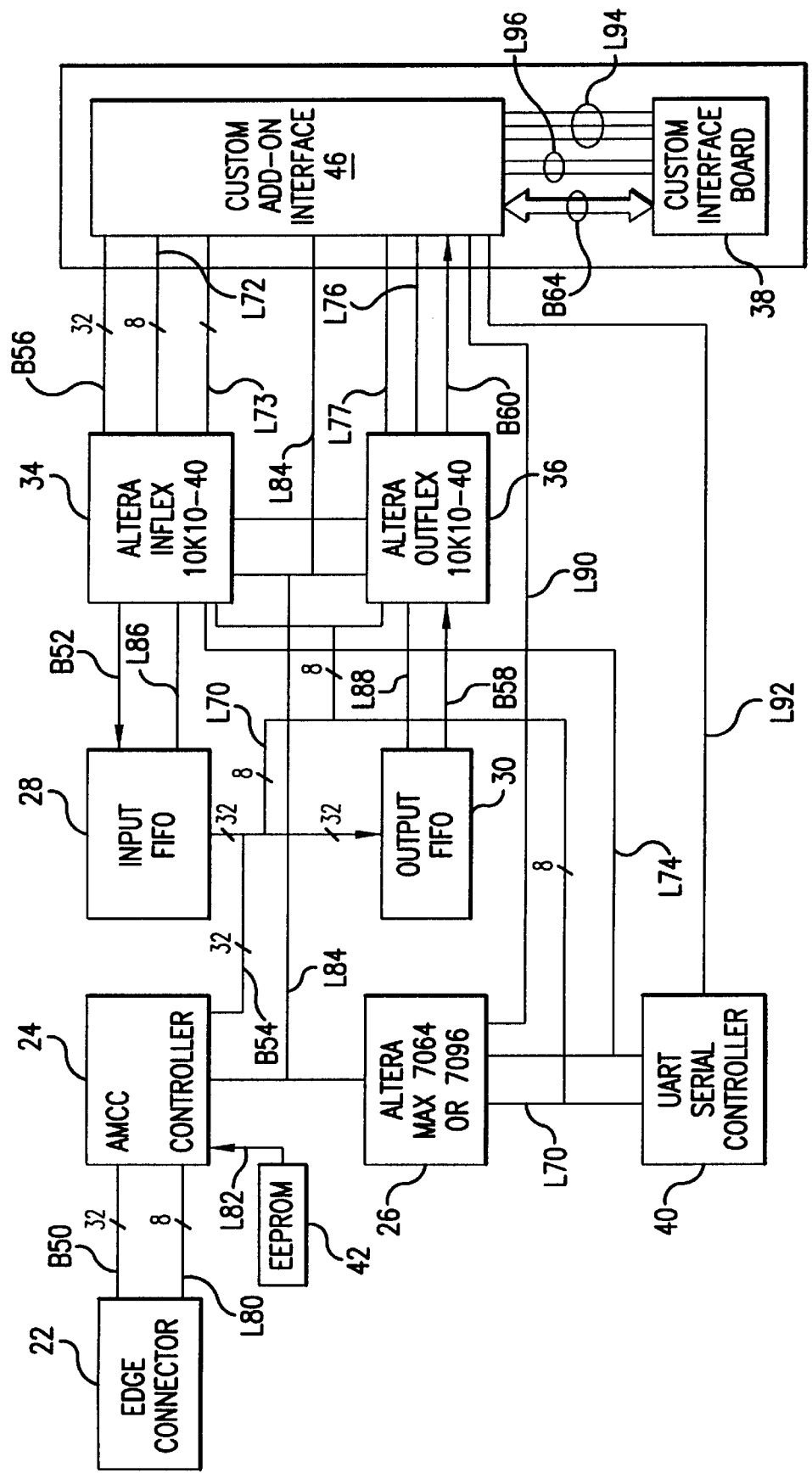
FIG. 2 is a block diagram of one embodiment of an interface card according to the invention, which would be employed in the system of FIG. 1.

The interface card shown in FIG. 2 includes an edge connector 22, which is a standard interface that connects the interface card to a motherboard, such as motherboard 6 of FIG. 1. Edge connector 22 may be, for example, a PCI connector or AGP connector.

It is presently preferred that connector 22 be constructed for connection to a 32-bit bus on motherboard 6 so that at a clock rate of, for example, 33 MHz, it is possible to transfer a total of 132 megabytes per second, each byte containing 8 bits.

Connector 22 is connected to a chip 24 which is a PCI or AGP controller chip. The particular chip employed in a prototype card according to the present invention was marketed by AMCC™. Chip 24 is a large integrated circuit having all of the processing capability to carry out handshakes, or to coordinate with the PCI or AGP protocol. Essentially, chip 24 performs the steps necessary to supply data to the motherboard bus via connector 22 and to receive data, via connector 22 from the motherboard bus.

The interface card further includes a pass through control chip 26, an input FIFO data buffer 28, an output FIFO data buffer 30, two flexible, or user configurable, hardware chips 34 and 36, a custom interface board 38, a UART serial controller, or port, 40 and a configuration EEPROM 42. Custom interface board 38 is composed essentially of a custom add-on interface 46, such as an RS422 interface.

Interface 46 may be constituted by one or two daughterboards constructed to interface with a specific digital photocopier. Only the interface need be constructed to match the specific copier. Therefore, a single basic card can be adapted to any digital photocopier by selection of appropriate daughterboards on board 38. The daughterboard, or one of the daughterboards, may store data identifying the daughterboard and this identifying data can be read by gate array logic on, for example, control chip 26 and then passed to the main program to inform the latter of the identity of the copier assumed to be connected to board 38.

Interface 46 may, for example, be constructed to have an $I^2C$ operating capability.

The above-mentioned chips are interconnected by the following data and clock busses and control lines:

32-bit data busses:
- B50 connected between connector 22 and controller 24;
- B52 for conducting data from chip 34 to data buffer 28;
- B54 for transferring data from controller chip 24 to data buffer 30 and from data buffer 28 to controller chip 24;
- B56 for transferring data from chip 34 to board 38;
- B58 connected for transferring data from data buffer 30 to hardware chip 36; and
- B60 connected for transferring data from chip 36 to interface board 38;

8-bit busses:
- L70 for transferring data between bus B54 and chips 26, 34, 36 and 40. Bus L70 consists of an extension of eight bit lines of bus B54;
- L72 and L73 for transferring control and configuration data between chip 34 and board 38;
- L74 for transferring pass through I/O control signals between one and the other of control chip 26, hardware chips 34 and 36 and serial controller 40; and
- L76 and L77 for transferring control and configuration data between chip 36 and board 38; and
- L92 for transferring serial control signals between serial controller 40 and custom interface board 38, and serial control lines:
- L80 for transferring control signals between connector 22 and chip 24;
- L82 for transmitting configuration data from EEPROM 42 to controller chip 24;
- L84 connected to transfer clock signals and DMA control signals among controller chip 24, pass through control chip 26, flexible hardware chips 34 and 36 and custom interface board 38;
- L86 for transferring control signals between data buffer 28 and flexible hardware chip 34;
- L88 for transferring control signals between flexible hardware chip 36 and data buffer 30;
- L90 for transferring $I^2C$ signals between pass through control chip 26 and interface 46; and
- L92 for transferring serial control signals between serial controller 40 and custom interface board 38.

In addition, custom interface board 38 includes an input/output bus B64, which may consist either of a 32-bit input bus and a 32-bit output bus, or a 32-bit bidirectional bus, as well as a plurality of serial control and configuration signal lines L94 and a group of 8 inflex and 8 outflex control lines L96.

All of the busses and lines which are connected from other chips on the card to interface board 38 are coupled directly to interface 46. A cable containing bus B64 and lines L94 and L96 is connected between board 38 and copier 16 of FIG. 1.

Control lines L72 and L76 provide signals that perform timing functions in the photocopier, as well as controlling resetting of the copier and informing the copier of the type of image to be printed and its size and location on the paper sheet. Configuration lines L73 and L77 are connected to a configuration EEPROM IC in interface 46 which carries data identifying the photocopier requirements and characteristics. These lines transfer signals identifying the specific interface 46 to control chip 26.

Connector 22 is connected to controller chip 24 by 32-bit data bus B50 and a suitable number of control lines L80. Data flow over bus B50 and lines L80 may be bidirectional.

If image data is to be outputted to the photocopier, data can flow from the motherboard RAM 10 directly through connector 22 without requiring that the computer CPU perform any control functions, which is the basic principle of direct memory access (DMA). Thus, the computer CPU can continue controlling other computing and calculating operations while data is being transferred through connector 22.

Data transferred from motherboard RAM 10 to the interface card will flow from connector 22 through controller chip 24 to output FIFO data buffer 30 via busses B50 and B54. As a general rule, buffers 28 and 30 need not have a capacity of more than 8 kbits. The data will then be transferred from data buffer 30 to chip 36.

Each of hardware chips 34 and 36 is programmable, after fabrication, to form a selected logic circuit. Chip 36 is programmed to control transfer of data from data buffer 30 to interface 46, and then to the digital copier, while chip 34 is programmed to control transfer of data from the digital copier via interface 46 to data buffer 28. Flexible hardware chips 34 and 36 permit data to be handled in a convenient manner, as will be explained below.

Buffers 28 and 30 may be components of the type marketed by Cypress Technologies. Hardware chips may, as shown in FIG. 2, be of a type marketed by ALTERA.

When a document is to be printed in copier 16, the main program will operate to transfer image data from RAM 10 to copier 16 along the following path: edge connector 22, bus B50, controller 24, bus B54, data buffer 30, bus B58, hardware chip 36, bus B60, interface 46 and bus B64. According to one feature of the invention, hardware chip 36 is configured to divide each group of 32 bits arriving from data buffer 30 into four 8-bit bytes and the individual 8-bit bytes are then sent in series to the photocopier.

In further accordance with the invention, an image contained on a document can be scanned by the photocopier scanner and the resulting scanning data can then be transferred, via the interface card, to RAM 10 on motherboard 6. For this purpose, a document carrying any graphic image can be placed on the scanning glass of photocopier 16. The image is then scanned, producing a stream of data which flows through interface 46 and hardware chip 34. 32-bit units of the data can then be transferred to data buffer 28.

In this operation, successive 8-bit bytes delivered from the digital photocopier to the interface card are conducted via interface 46 to flexible hardware chip 34, where they are combined into 4-byte, or 32-bit, groups. The 32 bits of each such group are sent in parallel to RAM 10 along the following path: bus B52, data buffer 28, bus B54, controller 24, bus B50 and edge connector 22. Data is conducted from buffer 28 through controller 24 and connector 22 to the computer motherboard RAM, under control of clock signals produced within the computer.

In the embodiment described above, hardware chip 36 could simply be constituted by a time division multiplexer and chip 34 by a time division demultiplexer. The reason for using flexible hardware chips is to allow a single card to be configured to interface with a variety of digital copiers.

This conversion between 32-bit units and 8-bit units on the interface card enables the data handling capabilities of the copier to be accommodated while minimizing the computer resources required for copier operation. If the copier is configured to only receive 8-bit data words, the transfer of 32-bit units in either direction between the interface card and the computer memory allows the time which the computer must allocate to these transfers to be minimized, while the operations necessary to communicate with the copier are performed on the interface card.

By temporarily storing data in buffer 28, it becomes possible to deliver data to the interface card in a manner which takes into account variations in the rate at which data is generated by the copier scanner, while using the computer clock to then transfer data from buffer 28 to the motherboard PAM.

Pass through control chip 26 may be, for example, an ALTERA MAX 7064 or 7096 control chip and is operated to perform what are known as "housekeeping functions". When the computer is first turned on, configuration data for the other chips on the interface card will be transferred through control chip 26.

Lines L92 provide communication between the copier and controller 40 in order to provide commands and instructions required for proper communications with copier 16.

In a manner similar to the operation of buffer 28 and chip 34, buffer 30 and chip 36 cooperate to deliver data from the computer memory under control of a clock in the copier. This data will be used by the copier to print a graphic image on a medium, typically a paper sheet.

EEPROM 42 is a nonvolatile memory which stores configuration data that acts to configure controller chip 24 when the computer is turned on.

According to a particular feature of the invention, all transfer of data between the interface card and the computer is controlled by a clock on the computer motherboard, while all transfer of data between the interface card and the copier is controlled by a clock forming part of the copier. Essentially, buffers 28 and 32, although they both have a relatively small capacity, enable this transfer of clock control to take place so that operation of the computer and the copier at two different clock speeds does not result in any conflicts or malfunctions.

Buffer 28 thus compensates for the fact that the copier clock speed will typically be lower than the computer clock speed and that scanning processes performed by the copier will inherently result in the generation of data in an intermittent manner. When buffer 28 becomes filled to a certain point, data stored therein will be clocked into RAM 10 through controller chip 24 and edge connector 22.

More specifically, as long as the copier is turned on, it continuously produces a clock signal which is delivered to card 12, and specifically to chip 34. Whenever the copier is scanning a previously printed document or printing a document, it provides an indication which causes a component on card 12 to produce a "frame-valid" signal. The latter signal is ANDed with the copier clock, and the ANDed clocks are counted.

After a 32 bit word has been clocked to buffer 28, during which 32 clock pulses are delivered over one of lines L86, a flag is set which indicates that buffer 28 contains data. Controller 24 then clocks 32-bit words, or units, to motherboard RAM 10. This continues until buffer 28 is empty.

A reverse procedure takes place, via buffer 30 and chip 36, during printing.

Serial controller 40 is provided to allow the necessary communications to be performed with certain electronic photocopiers. For example, an existing Xerox® digital photocopier requires that, in addition to data and some handshaking communications, commands and instructions be sent over a conventional serial port, such as an RS232. A port operating at the RS232 level is not necessary, but command data must be sent to the copier in a similar manner, and specifically in an asynchronous manner, via a device such as serial controller 40. In operation, 8-bit bytes of command data are delivered to controller 40 via line L74 and controller 40 will send individual bytes over a single line, such as one of lines L92, and then through interface 46 to the photocopier. Serial controller 40 can also receive the 8 bits of each byte in a serial manner from the copier, group them together into 8-bit bytes, and transfer the bits of each byte in parallel to memory 10 on motherboard 6.

As a general rule, the operation of a connector, which is coupled to a multibit bus on the computer motherboard, and a serial port on the computer involve two different types of functions. In addition, certain demands are created by the strict time requirements imposed on issuing commands at precise times or within small time windows to existing digital photocopiers. Many of these difficulties can be minimized, and programming can be simplified, by providing a UART serial controller directly on the interface card, rather than relying on a separate serial controller provided on the computer. By placing a selected serial controller on the interface card, it becomes possible to control all operations under the program flow management of the software provided. Related benefits resulting from installation of a serial controller on card 12 have been described earlier herein.

Special formatting of data for delivery to a digital photocopier is necessary because, unlike printer interfaces which almost invariably operate according to the Centronix standard, each digital photocopier brand now on the market uses a different interface. Although they are all similar in that they all have data lines, clock lines and control lines, digital photocopier interfaces are all proprietary interfaces having slightly different requirements as to timing and types of signals which are to be used. In addition, digital photocopiers, and particularly color photocopiers, require much higher data rates than are possible with the standard Centronix printer interface, as a result of which existing printer interfaces are not usable for the purposes here at hand.

Figure 3:
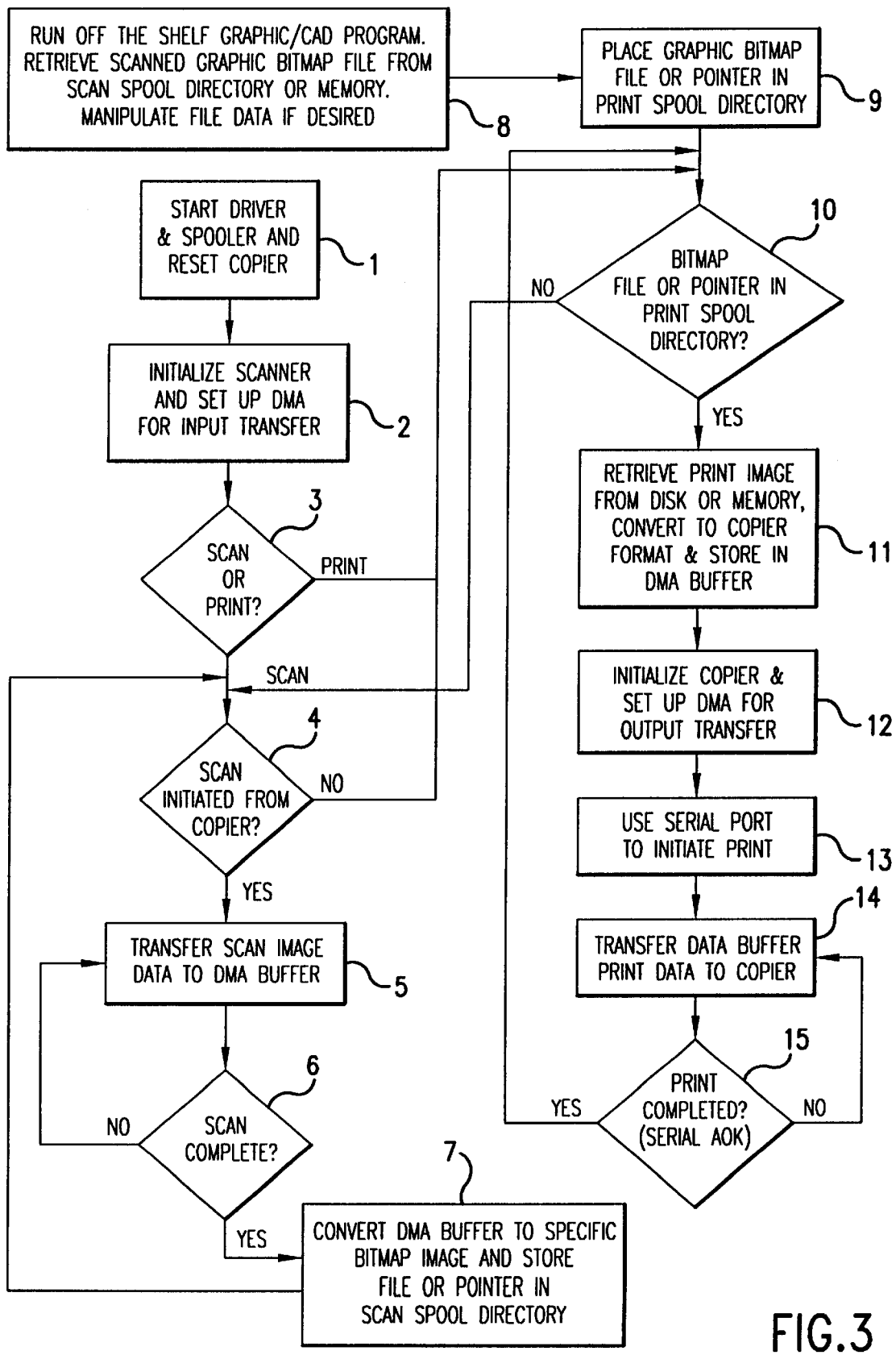
FIG. 3 is a programming flow diagram illustrating control of the system shown in FIG. 1 according to the present invention.

An example of the program, or software, which must be provided in addition to the commercially available graphics software is illustrated in FIG. 3, which is a programming flow diagram consisting of a series of steps as described below.

Step 1

A driver for the interface card is started and a spool directory is set up by a start command input via the computer keyboard. The main program then clears, or frees, memory, allocates memory, causes the driver to initialize the interface card, downloads configuration data for components 26, 34 and 26 from a module of the main program to the interface card and initializes a designated serial port for communication to the photocopier. Then, the main program issues serial commands to reset the copier for both scanning and printing by conducting a two-way exchange between the copier and the computer via the serial port and hardware control lines to reset the copier.

The main program allows coordination between the two-way exchange and the manipulation of various hardware control lines to cause the reset operation.

Step 2

Then, the copier is set up, and the program is configured so that when the copier produces a copy in its normal copying mode, i.e., by scanning an original, image data generated in the copier scanner can be transferred to the computer memory via the interface board. Data is clocked into the board by the copier.

Step 3

The program then looks for an input indication that either a scan is to be performed or a print is to be made.

Step 4

If the output of step 3 indicates that a scan is to be performed, the main program monitors the copier state at regular intervals to determine whether a document is being scanned. A photocopier clock line output is connected to a byte counter which is located in controller chip 24 and which is initially set to zero. The counter state is checked, for example, every two seconds, to determine if it is storing a nonzero value, indicating that a document scan has begun.

This step allows the print image data for every document to be stored in memory, and then on disc, automatically, without requiring any human intervention, as mentioned above.

Step 5

The image data generated during each scanning operation, i.e., during scanning of a page, is transferred to a DMA buffer that is constituted by a portion of RAM 10 on motherboard 6. While a copy is being made in the copier, data flows from the copier to the interface card and from there into the DMA buffer on the computer motherboard memory, under control of a conventional automatic DMA process. Because the data goes directly into the motherboard memory, the data can be moved from the DMA buffer into an application software buffer constituted by another part of RAM 10 in a comparatively short time, of the order of a few seconds. Alternatively, the data can be processed directly from the DMA buffer.

Step 6

A determination is made of whether a scan has been completed, i.e., whether a full page has been scanned. This is accomplished by interrogating the current value of the DMA byte counter at fixed intervals, each interval having a duration determined by the characteristics of the copier. When the value has not changed during one interval, it is concluded that a scan has been completed, and operation proceeds to step 7; otherwise, operation returns to step 5.

Step 7

Data stored in the DMA buffer, in bitmap form, is rearranged according to the order required by the copier and is stored in the scan spool directory in a CMYK TIFF format. Alternatively, the data may remain in memory and a pointer to the location of that data may be stored in the scan spool directory. The value stored in the DMA byte counter will identify the size of the image file. Using, for example, a look-up table, the size indicated by the counter value is compared with all possible image sizes and formats. From this table, the size of the image can be determined, as well as whether it is a color or monochrome image. This information is encoded in a header which is placed at the beginning of the file, as a required part of TIFF protocol, and the data is arranged according to that format. The file is then written to a hard drive directory with the extender TIF, which acts as a flag to other programs that can then display or use the information. Furthermore, in this step, a computer hard drive directory is interrogated to locate any file that begins SCANn.TIF, where "n" is an integer. The program increment is numbered and creates a new file name SCAN (n+1).TIF.

The program is preferably configured so that the data representing the image transferred to RAM 10 and being scanned is automatically saved to the computer's hard drive, even if a copy is not to be immediately made.

Upon completion of step 7 for one document, operation returns to step 4.

Step 8

This step is initiated by manual input of a command via a keyboard of a computer, which may be the same computer as that containing the interface card or another computer which is linked to the computer containing the interface card via a network and which is operating according to an independent program, for example an off-the-shelf graphics/CAD or a desktop publishing program such as Photoshop™ Adobe™, Corel™, etc. These programs are implemented by keyboard and mouse commands according to instructions provided by the software publisher.

Under control of such a program, a scanned graphic bitmap file may be retrieved from the scan spool directory or memory. The retrieved file may be in a 32-bit CMYK format, or in an eight-bit gray scale format, or in any other useable format. The retrieved file provides an image which can then be displayed and then manipulated to place it in a desired form. When an image has been placed in the desired form using such a program, the image is converted to a graphic bitmap file in a suitable format, such as a CMYK TIFF format Step 9

Then, the file can be stored on disk in the print spool directory or the file can be placed in memory and a pointer to that file can be placed in the print spool directory or in memory or a pointer is placed in the print spool directory.

Step 10

Upon completion of step 9, a determination is made whether there is a bitmap file or pointer in the print spool directory. This determination is also made if the response in step 3 was "PRINT" or if the response in step 4 was "NO".

If any one of those conditions exists, the print spool directory is interrogated to determine whether any bitmap file or pointer is present therein. The actual implementation of this step involves reading the print spool directory at regular intervals, for example every few seconds, as long as the program is running. The directory is examined to determine whether any files with the TIFF extender are present, while files whose name begins with SCAN are ignored whenever the same directory is used for both scan and print files.

In addition, upon detection of a TIFF file to be printed, the program initiates a print process. In other words, in the procedure according to the invention, the program operation can automatically move from a scan mode to a print mode without operator intervention.

When the response in step 10 is "NO", operation proceeds to step 4.

Step 11

If step 10 indicates that there is a bitmap file or pointer in the print spool directory, then the print image data is retrieved from disk or memory, converted to appropriate format for the copier, and stored in the DMA buffer. At this point, the program retrieves a print image file which has been found, deletes header information forming part of that file, and rearranges the data into the sequence required by the copier. This is done under control of instructions relating to the copier format. All of the data for the file now rests in the DMA buffer area of the motherboard memory. Generally, this data represents all of the elements of an image which is to be printed on a single paper sheet.

Step 12

The copier is initialized, and DMA is set up for output transfer. This is achieved as a result of a serial dialogue carried out between the copier and the program, during which the copier is switched to print mode, and the DMA process is initialized. At this point, data for producing a printed image on a page is in a condition to be sent to the copier.

Step 13

After initialization has been completed in step 12, additional serial commands are sent to the copier to instruct it to begin printing.

Step 14

After the copier has been instructed to begin printing, image data is transferred from the DMA buffer area in the motherboard memory to the copier under control of clock pulses generated in, and delivered from, the copier. Thus, the rate of delivery of image data is controlled by the copier, thereby assuring that proper operation of the copier will not be prevented by any inconsistency between the frequency and phase of the copier clock and those of the computer clock.

Step 15

The program periodically sends serial inquiries to the copier to determine whether printing is completed. If the copier does not indicate that printing is completed, the process returns to step 14. If the copier indicates that the printing process is completed, operation returns to step 10.

Thus, the method according to the invention has the following significant characteristics:

1. The main memory of the PC, which main memory is present on the computer motherboard, is employed to store the data which will supply to the copier graphics and/or text data sufficient to print a full page;
2. On the interface board according to the invention, the serial interface will be integrated, thus simplifying multitasking programming;
3. The interface board has a FIFO register to buffer asynchronous processing of DMA transfer and copier printing;
4. The interface board is configurable on the fly to implement special functions such as vertical and horizontal doubling of image size by using a 200 dpi data in and 400 dpi data out. This saves time and memory space. Horizontal doubling is done in the configurable gate array, and vertical doubling is effected using the retransmit feature of buffer 30; and
5. The custom interface board according to the invention can be made up of daughterboards which match specific requirements of individual copiers and contain data to inform the interface board itself of the nature of the daughterboard installed.

A card according to the invention is configurable by data supplied via connector 22 or interface 46, or even via a modem.

Although the invention has been described in connection with a digital photocopier, an interface card according to the invention can also be constructed to control, and interface with, printers, sound devices, logic analysis devices, etc. The interface card can be coupled to such an external device via, for example, an IEEE1394 device, a fiber optic, a bus and signal and control lines as described earlier herein, or any combination of such coupler.

In the above description, reference was made to the CMYK full color format. However, the invention can be implemented with any other color format, including, but not limited to, RGB, and L (luminance) a b (color differences). The invention can also be implemented with partial color and monochrome formats.

The illustrated embodiment is composed of a single motherboard and a single interface card. However, embodiments of the invention can be equipped with a plurality of interface cards and/or a plurality of motherboards. Such systems can have enhanced capabilities, including the capability of interfacing with a number of printing devices. Several cards can be coupled to one motherboard. When several motherboards are provided, they can be interconnected by PCI bus links. Such links are supported by Windows® NT5, which is currently under development.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Apparatus for printing a graphic image on a substrate, comprising:

a computer containing at least one motherboard which carries a data bus and a random access memory, said computer being controlled by an operating system;

means for storing image data in said random access memory;

at least one interface card connected to said data bus and having a serial port connected to the data bus, a printing device interface, and means for transferring stored image data from said random access memory to said printing device interface;

a digital printing device connected to said interface for printing the graphic image on the substrate on the basis of stored image data transferred from said random access memory, the digital printing device communicating with the data bus via the serial port;

said printing device printing the graphic image in response to image data in a first format;

said means for storing image data storing image data in a second format different from the first format; and said means for transferring stored image data comprising conversion means for converting image data in the second format into image data in the first format by multiplexing different portions of the image data in the second format and for delivering image data converted into the first format to said printing device.

2. The apparatus according to claim 1 wherein said means for storing image data are operative for storing a quantity of image data sufficient to print the graphic image on the entire substrate, and said means for transferring are operative for continuously transferring the quantity of image data sufficient to generate the graphic image on the entire substrate.

3. A method for printing a graphic image on a substrate, comprising:

providing a computer containing at least one motherboard which carries a data bus and a random access memory, the computer being controlled by an operating system;
an interface card connected to the data bus and having a printing device interface and means including a serial port for transferring stored image data from the random access memory to the printing device interface and a digital printing device connected to the printing device interface;

storing image data in the random access memory;

transferring stored image data from the random access memory to the printing device interface;

printing the graphic image on the substrate in the printing device on the basis of stored image data transferred from the random access memory;

said printing device printing the graphic image in response to image data in a first format;

said step of storing image data storing image data in a second format different from the first format; and said step of transferring stored image data comprising conversion means for converting image data in the second format into image data in the first format by multiplexing different portions of the image data in the second format and delivering image data converted into the first format to said printing device.

4. The method according to claim 3 wherein said step of storing image data stores a quantity of image data sufficient to print the graphic image on the entire substrate, and said step of transferring continuously transfers the quantity of image data sufficient to generate the graphic image on the entire substrate.

5. Apparatus for printing a graphic image on a substrate, comprising:

a computer containing at least one motherboard which carries a data bus and a random access memory, said computer being controlled by an operating system;

means for storing image data in said random access memory;

at least one interface card connected to said data bus and having a serial port thereon which is connected to the data bus, a printing device interface, and means for transferring stored image data from said random access memory to said printing device interface, the serial port being driven by software which is independent of the operating system;

a digital printing device connected to said interface for printing the graphic image on the substrate on the basis of stored image data transferred from said random access memory the digital printing device communicating with the data bus via the serial port;

the motherboard including a first clock for controlling transfer of data between the interface card and the computer and the digital printing device including a second clock for controlling transfer of data between the interface card and the digital printing device; and the first and second clocks operating at different rates, and the interface card including input and output first in first out data buffers for transferring clock control of data between the first and second clocks.

6. Apparatus for printing a graphic image on a substrate, comprising:

a computer containing at least one motherboard which carries a data bus and a random access memory, said computer being controlled by an operating system;

means for storing image data in said random access memory;

at least one interface card connected to said data bus and having a serial port thereon which is connected to the data bus, a printing device interface, and means for transferring stored image data from said random access memory to said printing device interface, the serial port being driven by software which is independent of the operating system;

a digital printing device connected to said interface for printing the graphic image on the substrate on the basis of stored image data transferred from said random access memory, the digital printing device communicating with the data bus via the serial port;

the interface card including means for reconfiguring the interface card in order to interface to a plurality of different digital printing devices; and the means for reconfiguring including a memory within the printing device interface for storing data identifying requirements and characteristics for the digital printing device and flexible hardware chips configurable to interface with the digital printing devices.

* * * * *